J. M. P. Lyon,
Cotton Scraper.
No. 110,988. Patented Jan. 17, 1871.
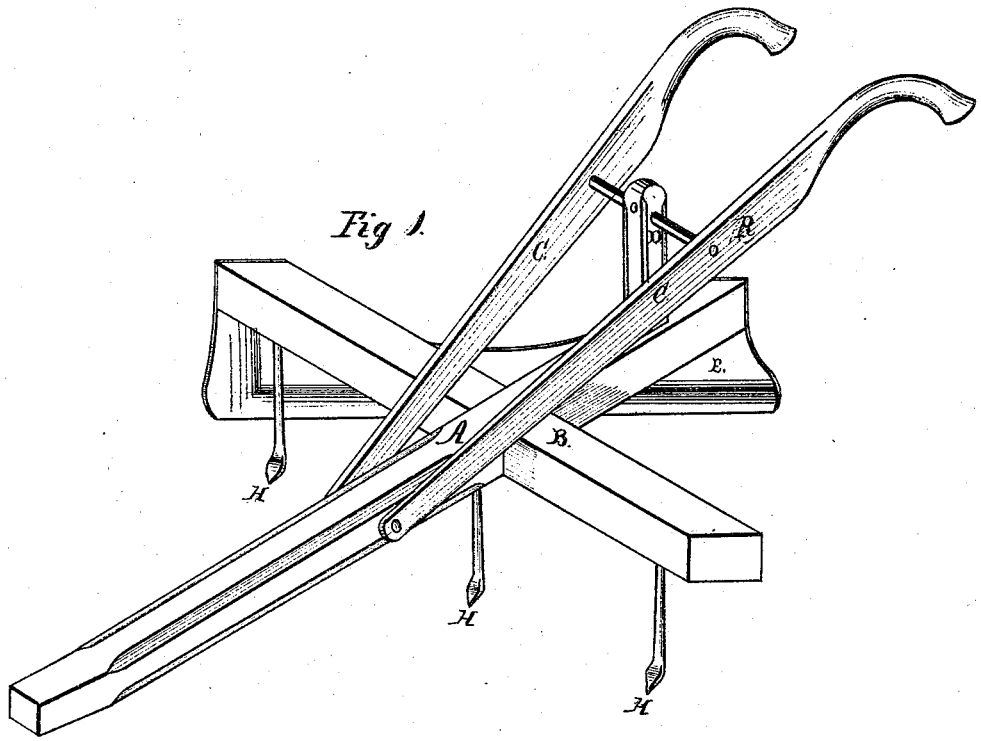
Fig 1.
Fig 2.
Witnesses.
John H. Ivy
John A. Shelton
Inventor:
J. M. P. Lyon

UNITED STATES PATENT OFFICE.

JOHN M. P. LYON, OF BELLEFONTE, ALABAMA.

IMPROVEMENT IN COTTON SCRAPERS AND HARROWS.

Specification forming part of Letters Patent No. 110,988, dated January 17, 1871; antedated January 9, 1871.

*To all whom it may concern:*

Be it known that I, JOHN M. P. LYON, of Bellefonte, in the county of Jackson and State of Alabama, have invented a certain new and useful Combined Cotton Scraper and Harrow, of which the following is a specification.

My invention relates to the construction of a combined cotton scraper and harrow; and it consists in attaching an iron or steel scraper to the ends of the longitudinal and transverse beams of a cotton-harrow in such a manner that the scraper will follow in the rear of the harrow-teeth, and at such a depth below the surface of the ground that it will cut all grass, weeds, clods, &c., and scrape them into the center of the cotton-row while the ground is being harrowed.

In the drawings, Figure 1 is a perspective view of my combined cotton scraper and harrow. Fig. 2 is a perspective view of the scraper alone.

A is a longitudinal beam, four feet long and four inches square.

B is a transverse beam, two feet long and four inches square.

C C are handles, four feet long.

D is an upright framed into the beam A.

R is a rod which passes through the upright D, near its top, to support the handles C C, all being constructed of wood, and similar in all material respects to harrows now in common use.

E is a scraper, which is two feet long and six inches wide, and may be made of any metallic substance, or of wood. It is, however, usually made of cast-steel.

F F are two slots, one in each end of the scraper E, by which it may be raised or lowered when fastened to the harrow. The scraper E is made fast to the harrow on the right side, at the ends of the beams A and B, by bolts or screws.

H represents iron or steel harrow-teeth.

I do not confine myself to the dimensions herein given.

The invention may be made larger or smaller in any or all of its dimensions.

I claim as my invention—

The scraper E, in combination with a cotton-harrow, constructed and operated as described, for the purpose hereinbefore specified.

JOHN M. P. LYON.

Witnesses:
 W. H. NORWOOD,
 J. P. HASSETT.